US008464345B2

(12) United States Patent
Satish et al.

(10) Patent No.: US 8,464,345 B2
(45) Date of Patent: Jun. 11, 2013

(54) BEHAVIORAL SIGNATURE GENERATION USING CLUSTERING

(75) Inventors: Sourabh Satish, Fremont, CA (US); Shane Pereira, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 401 days.

(21) Appl. No.: 12/769,262

(22) Filed: Apr. 28, 2010

(65) Prior Publication Data

US 2011/0271341 A1    Nov. 3, 2011

(51) Int. Cl.
*G06F 11/00*          (2006.01)

(52) U.S. Cl.
USPC ........ 726/23; 726/1; 726/22; 726/24; 726/25; 713/188; 706/20

(58) Field of Classification Search
USPC .................. 726/22–25, 2; 713/153, 187, 188
See application file for complete search history.

(56) References Cited

U.S. PATENT DOCUMENTS

| 7,260,846 | B2 * | 8/2007 | Day | 726/23 |
| 7,519,998 | B2 * | 4/2009 | Cai et al. | 726/24 |
| 7,530,106 | B1 * | 5/2009 | Zaitsev et al. | 726/22 |
| 7,694,150 | B1 * | 4/2010 | Kirby | 713/188 |
| 7,809,659 | B1 * | 10/2010 | Paiz | 706/20 |
| 8,091,093 | B2 * | 1/2012 | Huntsman | 719/318 |
| 8,201,244 | B2 * | 6/2012 | Sun et al. | 726/22 |
| 2005/0240999 | A1 * | 10/2005 | Rubin et al. | 726/22 |
| 2007/0006314 | A1 * | 1/2007 | Costa et al. | 726/25 |
| 2007/0079375 | A1 * | 4/2007 | Copley | 726/22 |
| 2007/0136455 | A1 * | 6/2007 | Lee et al. | 709/223 |
| 2007/0192863 | A1 * | 8/2007 | Kapoor et al. | 726/23 |
| 2008/0127336 | A1 * | 5/2008 | Sun et al. | 726/22 |
| 2008/0201779 | A1 | 8/2008 | Tahan et al. | |
| 2009/0158430 | A1 * | 6/2009 | Borders | 726/23 |
| 2009/0300765 | A1 | 12/2009 | Moskovitch et al. | |
| 2010/0180344 | A1 * | 7/2010 | Malyshev et al. | 726/23 |
| 2010/0251369 | A1 * | 9/2010 | Grant | 726/23 |

FOREIGN PATENT DOCUMENTS

EP    2128798 A1    12/2009

OTHER PUBLICATIONS

Andreas Moser, Exploring Multiple Execution Paths for Malware Analysis, 2007, IEEE, pp. 1-15.*
R Perdisci, Behavioral clustering HTTP based malware and signature generation using malicious network traces, 2010, USENIX conference, vol. 7, pp. 1-14.*

(Continued)

*Primary Examiner* — Nathan Flynn
*Assistant Examiner* — Viral Lakhia
(74) *Attorney, Agent, or Firm* — Fenwick & West LLP

(57) ABSTRACT

A behavioral signature for detecting malware is generated. A computer is used to collect behavior traces of malware in a malware dataset. The behavior traces describe sequential behaviors performed by the malware. The behavior traces are normalized to produce malware behavior sequences. Similar malware behavior sequences are clustered together. The malware behavior sequences in a cluster describe behaviors of a malware family. The cluster is analyzed to identify a behavior subsequence common to the cluster's malware family. A behavior signature for the malware family is generated using the behavior subsequence. A trace of new malware is normalized and aligned with an existing cluster, if possible. The behavioral signature for that cluster is generated based on the behavior sequence of the new malware and the other sequences in the cluster.

20 Claims, 5 Drawing Sheets

OTHER PUBLICATIONS

PCT International Search Report and Written Opinion, PCT Application No. PCT/US2011/033829, Jul. 18, 2011, 10 pages.

Tian, R. et al., "An Automated Classification System Based on the Strings of Trojan and Virus Families," 2009 4th International Conference on Malicious and Unwanted Software (Malware), Oct. 13, 2009, pp. 23-30.

Apel, M. et al., "Clustering Malware for Generating Behavioral Signatures," Jul. 7, 2010, 1 page.

Bayer, U. et al., "Scalable, Behavior-Based Malware Clustering," 2009, 18 pages.

Perdisci, R. et al., "Behavioral Clustering of HTTP-Based Malware and Signature Generation Using Malicious Network Traces," NSDI, 2010, 14 pages.

Schneider, S. et al., "Automatic Generation of String Signatures for Malware Detection," Symantec Research Labs, Sep. 24, 2009, 26 pages.

Ye, Y. et al., "Automatic Malware Categorization Using Cluster Ensemble," KDD'10, Jul. 25-28, 2010, ACM, 10 pages.

PCT Written Opinion, PCT Application No. PCT/US2011/033829, Jul. 25, 2012, 7 pages.

* cited by examiner

BEHAVIORAL SIGNATURE GENERATION USING CLUSTERING

BACKGROUND OF THE INVENTION

1. Field of the Invention

This invention pertains in general to computer security and in particular to generating behavioral signatures for detecting malicious software.

2. Description of the Related Art

There is a wide variety of malicious software (malware) that can attack modern computers. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer.

Modern malware is often targeted and delivered to only a relative handful of computers. For example, a Trojan horse program can be designed to target computers in a particular department of a particular enterprise. Such malware is difficult for security software to detect because there are fewer instances of the same malware, and the security software might not be configured to recognize it. Moreover, even mass-distributed malware is becoming harder to detect because the malware can contain polymorphisms designed to evade detection.

In response to the increasing difficulty of detecting malware, security software is evolving toward heuristics-based detection. This type of detection uses a set of heuristics, such as behavioral signatures that describe behaviors indicative of malicious behavior, to identify malware. However, the huge amount of different malware makes it difficult to maintain behavioral signatures for the malware. Having many behavioral signatures introduces complexities in maintaining and using the signatures. For example, the analyses used to determine whether a piece of software is malicious grow more complex, and the computational resources consumed to make this determination increase, as the number of behavioral signatures increases.

BRIEF SUMMARY

The above and other issues are addressed by a method, computer system, and computer-readable storage medium for generating a behavioral signature for detecting malware. An embodiment of the method comprises using a computer to collect behavior traces of malware in a malware dataset. The behavior traces describe sequential behaviors performed by the malware. The method further comprises normalizing the behavior traces for the malware to produce malware behavior sequences and clustering similar malware behavior sequences together in a cluster. The malware behavior sequences in the cluster describe behaviors of a malware family. The method additionally comprises analyzing the cluster to identify a behavior subsequence common to the malware family and creating a behavioral signature for the malware family using the behavior subsequence.

An embodiment of the computer system comprises a non-transitory computer-readable storage medium storing executable computer program modules for performing steps. The steps comprise collecting behavior traces of malware in a malware dataset. The behavior traces describe sequential behaviors performed by the malware. The steps further comprise normalizing the behavior traces for the malware to produce malware behavior sequences and clustering similar malware behavior sequences together in a cluster. The malware behavior sequences in the cluster describe behaviors of a malware family. The steps additionally comprise analyzing the cluster to identify a behavior subsequence common to the malware family and creating a behavioral signature for the malware family using the behavior subsequence. The computer system also comprises a computer processor for executing the computer program modules.

An embodiment of the medium comprises a non-transitory computer-readable storage medium storing executable computer program modules for collecting behavior traces of malware in a malware dataset. The behavior traces describe sequential behaviors performed by the malware. The modules also normalize the behavior traces for the malware to produce malware behavior sequences and clustering similar malware behavior sequences together in a cluster. The malware behavior sequences in the cluster describe behaviors of a malware family. The modules additionally analyze the cluster to identify a behavior subsequence common to the malware family and create a behavioral signature for the malware family using the behavior subsequence.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
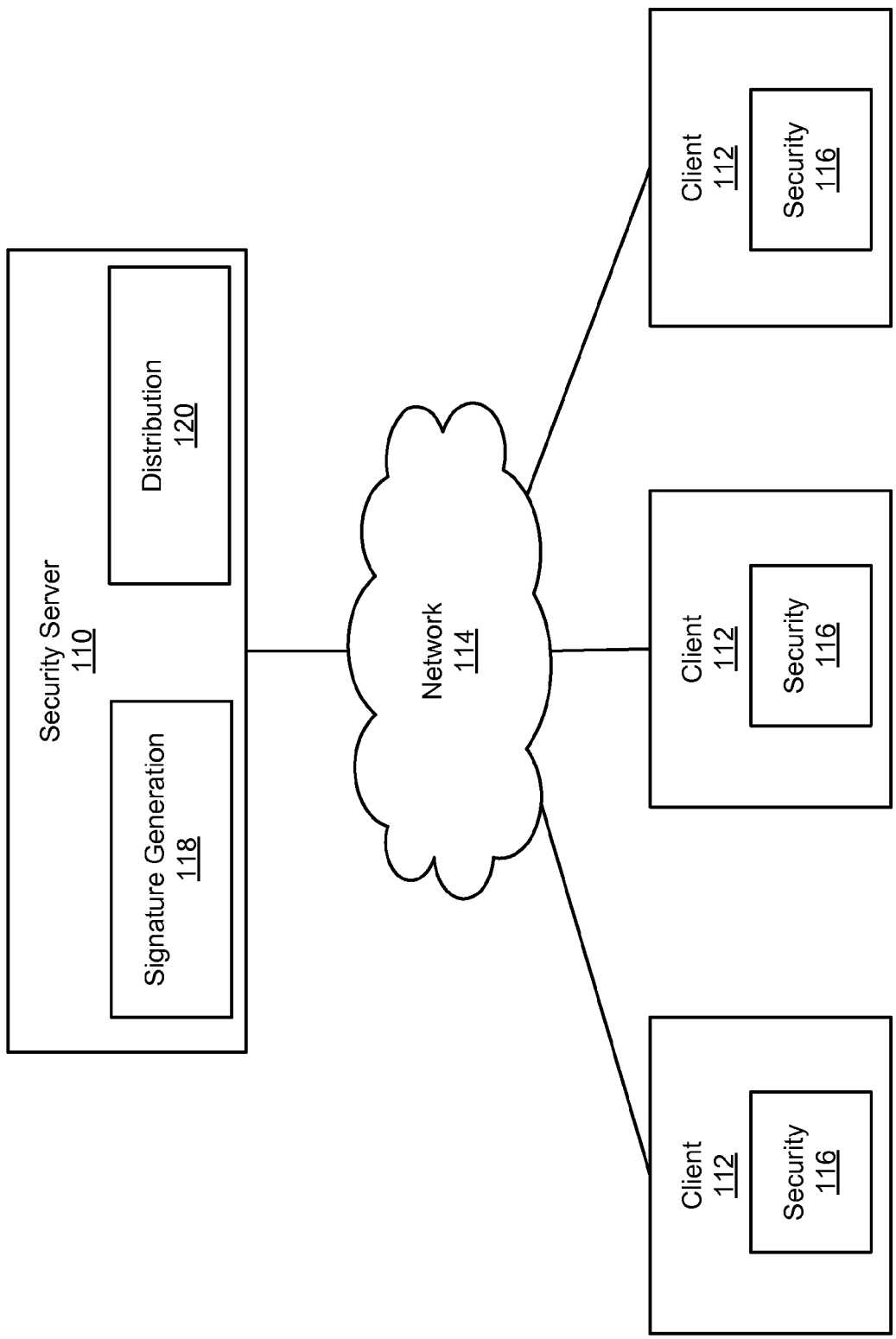
FIG. 1 is a high-level block diagram of a computing environment according to one embodiment.

FIG. 1 is a high-level block diagram of a computing environment 100 according to one embodiment. FIG. 1 illustrates a security server 110 and three clients 112 connected by a network 114. Only three clients 112 are illustrated in FIG. 1 in order to simplify and clarify the description. Embodiments of the computing environment 100 can have thousands or millions of clients 112. Some embodiments also have multiple security servers 110.

The clients 112 are electronic devices that can host malicious software. In one embodiment, a client 112 is a conventional computer system executing, for example, a Microsoft Windows-compatible operating system (OS), Apple OS X, and/or a Linux distribution. A client 112 can also be another device having computer functionality, such as a personal digital assistant (PDA), mobile telephone, video game system, etc. The client 112 typically stores numerous computer files that can host malicious software.

Malicious software, sometimes called "malware," is generally defined as software that executes on a client 112 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The clients 112 execute security modules 116 for detecting the presence of malware on the clients. A security module 116 can be, for example, incorporated into the OS of a client 112 or part of a separate comprehensive security package. In one embodiment, the security module 116 is provided by the same entity that operates the security server 110. The security module 116 communicates with the security server 110 via the network 114 to obtain detection data for detecting malware at the client 112.

The detection data obtained by the security module 116 include behavioral signatures. A behavioral signature describes a sequence of behaviors that are characteristic of malware. The security module 116 detects malware at the client 112 by observing the behaviors of software executing at the client to determine whether the behaviors match any of the behavioral signatures.

The detection data can also include data that describe other ways to detect malware at the client 112. For example, the detection data can include string signatures that identify sequences of data found in computer files that are characteristic of malware, reputations that the security module 116 can use to evaluate whether a given piece of software is malicious, and/or heuristics that identify states of the client 112 that are likely to indicate a malware attack.

In one embodiment, the security module 116 monitors the client 112 using the detection data and generates a report if it detects malware. The report notifies a user of the client 112 and/or another entity, such as an administrator of the client 112, of the detected malware. The security module 116 can also perform one or more actions to remediate the malware, such as blocking malicious behavior, quarantining the malware, and removing the malware.

The security server 110 is a hardware device and/or software module configured to generate and distribute the detection data to the clients 112. An example of the security server 110 is a web-based system providing security software and services to the security modules 116 of the clients 112. Depending on the embodiment, one or more of the functions of the security server 110 can be provided by a cloud computing environment. As used herein, "cloud computing" refers to a style of computing in which dynamically scalable and often virtualized resources are provided as a service over the network 114. Functions attributed to the clients 112 and security modules 116 can also be provided by the cloud computing environment.

One embodiment of the security server 110 includes a signature generation module 118 for generating behavioral signatures that the security modules 116 use to detect malware. The signature generation module 118 identifies clusters of software that perform similar behaviors. For a given cluster, the signature generation module 118 identifies a behavioral signature that can be used to detect the malware in the cluster. Moreover, when a new piece of malware is identified, the signature generation module 118 assigns the new malware to an existing cluster if possible. If the existing signature for the cluster to which the new malware is assigned cannot be used to detect the new malware, the signature generation module 118 generates a new behavioral signature that can be used to detect the malware in the cluster, including the new malware. The operation of the security server 110 is automated in one embodiment, which allows the behavioral signatures to be generated without manual intervention.

A distribution module 120 distributes the behavioral signatures, and other detection data, to the security modules 116 of the clients 112. In one embodiment, the distribution module 120 distributes the behavioral signatures on a rolling basis as new signatures are created. In another embodiment, the behavioral signatures are provided on a predetermined schedule and/or upon request by a security module 116.

The clustering-based signature generation technique performed by the security server 110 thus efficiently uses individual behavioral signatures to detect for multiple malware samples. As a result, the security server 110 distributes fewer behavioral signatures to the security modules 116 than would be required if each signature were specific to a single malware sample. Moreover, the size of the set of behavioral signatures used by the security modules 116 to detect malware is reduced relative to conventional techniques. This efficiency is maintained even as behavioral signatures are generated for newly-discovered malware. Accordingly, the signature generation technique provides for efficient and high-performance malware detection.

The network 114 represents the communication pathways between the security server 110, clients 112, and any other entities on the network. In one embodiment, the network 114 is the Internet and uses standard communications technologies and/or protocols. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
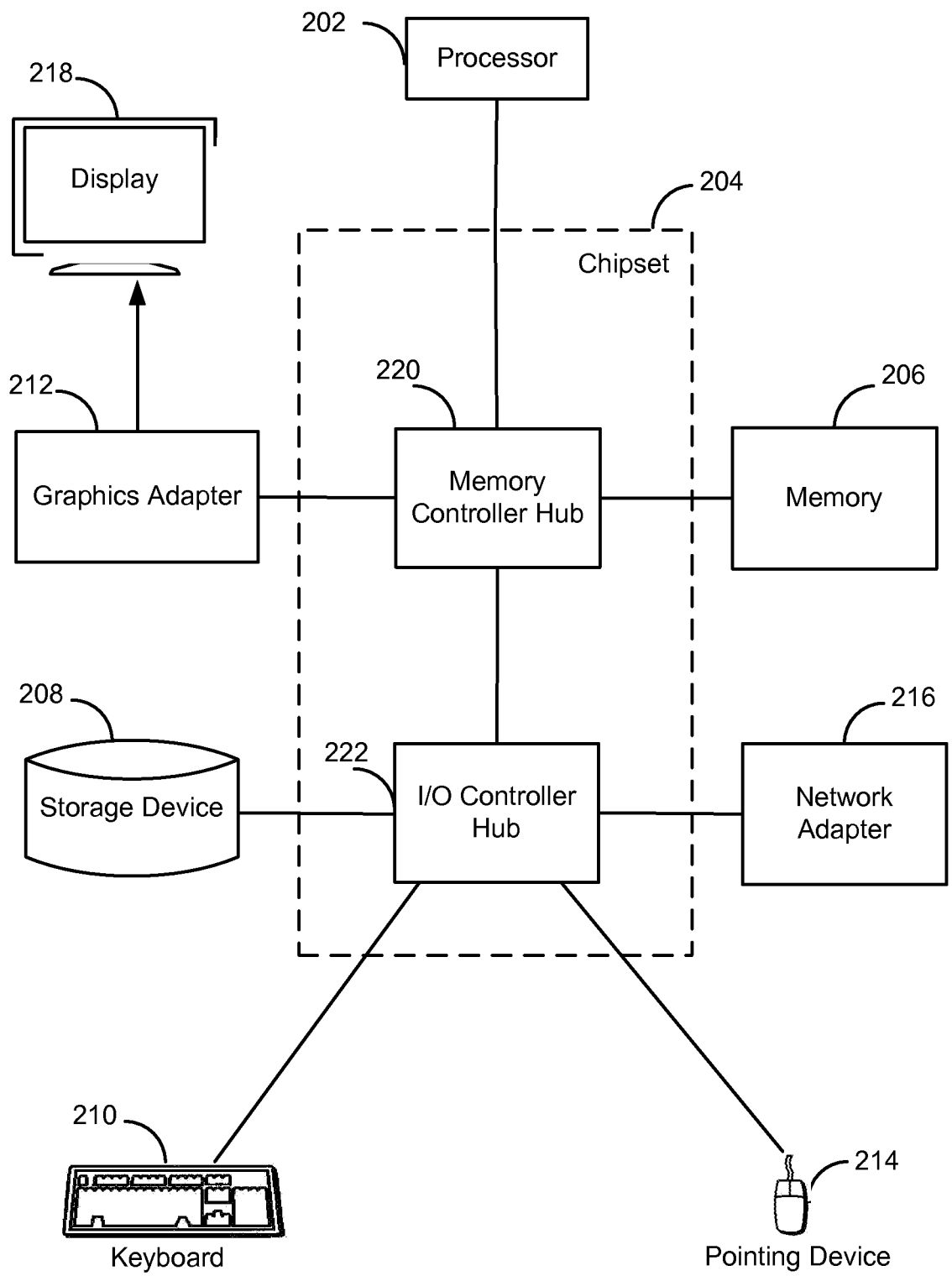
FIG. 2 is a high-level block diagram illustrating a typical computer for use as a security server or client.

FIG. 2 is a high-level block diagram illustrating a typical computer 200 for use as a security server 110 or client 112. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 116.

As is known in the art, a computer 200 can have different and/or other components than those shown in FIG. 2. In addition, the computer 200 can lack certain illustrated components. In one embodiment, a computer 200 acting as a security server is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Figure 3:
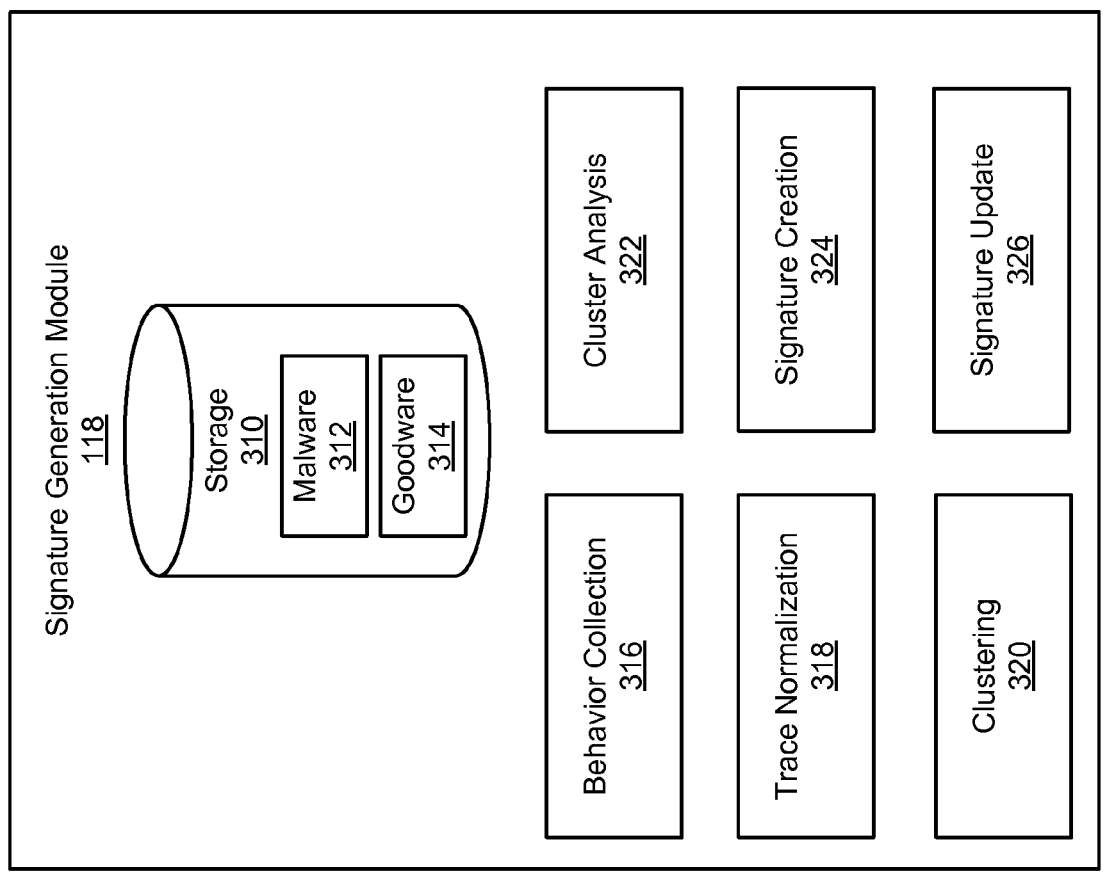
FIG. 3 is a high-level block diagram illustrating a detailed view of the signature generation module of the security server according to one embodiment.

FIG. 3 is a high-level block diagram illustrating a detailed view of the signature generation module 118 of the security server 110 according to one embodiment. As shown in FIG. 3, signature generation module 118 itself includes multiple modules. In some embodiments, the functions are distributed among these modules in a different manner than described herein.

A storage module 310 stores data used by the signature generation module 118. Examples of such data include software under evaluation, intermediate data created and used during the signature generation process, and created behavioral signatures. The data storage module 310 may include a relational database or another type of database.

As shown in FIG. 3, an embodiment of the storage module 310 stores datasets holding software of different classes. A malware dataset 312 stores samples of known malware. The malware in the dataset 312 can be obtained from the clients 112 and/or from other sources. In addition, the storage module 310 stores a goodware dataset 314 storing samples of known goodware. Goodware is software known to be non-malicious (i.e., legitimate). The goodware can include common and/or popular software programs that are frequently present on the clients 112. The malware 312 and goodware 314 in the datasets are collectively referred to as "software."

A behavior collection module 316 collects behavior traces for the software in the datasets 312, 314. A "behavior trace" for a software sample is a sequence of behaviors the software performs when executed. In one embodiment, the behavior collection module 316 executes each software sample in the datasets 312, 314 in an appropriate environment. The environment can be real or simulated. For example, if a particular software sample is intended to execute on a computer having a variant of the Microsoft Windows OS, the behavior collection module 316 can emulate the software in a virtual computing environment that simulates a Windows-based computer.

The behavior collection module 316 allows the software to execute long enough to observe a sequence of behaviors performed by the software. The length of the execution can be specified by, e.g., a number of instructions executed or a length of time of execution. The behavior collection module 316 provides the software with any parameters and/or environmental resources that the software requires in order to perform the specified amount of execution within the environment.

The behavior collection module 316 monitors the executing software in order to collect (record) the sequence of behaviors it performs. In one embodiment, the behavior collection module 316 specifically monitors application programming interface (API) calls to the OS made by the executing software and thus the behavior trace for the software is its API call sequence. Other embodiments of the behavior collection module 316 monitor and include different and/or additional data in a behavior trace.

A trace normalization module 318 normalizes the behavior traces of the executed software. The normalization places the behavior traces in a standardized representation so that different traces can be compared. In one embodiment, the trace normalization module 318 normalizes a behavior trace by standardizing representations of parameters that can differ in different execution instances, such as file paths, drive letters, and folder locations referenced in the API calls. For example, the parameters can be removed from the behavior trace and/or replaced with wildcard symbols. A normalized behavior trace is called a "behavior sequence."

The trace normalization module 318 can also group behaviors in the behavior traces into operations as part of the normalization. An "operation" is a set of related sequential behaviors that are grouped together. For example, software that obtains data from a file will often make a "file open" API call followed by a "file read" call. The trace normalization module 318 can combine these two calls into a single "file access" operation. Using operations in this manner reduces the size of the sequences without substantively altering the information content contained therein, and thus improves the efficiency of subsequent analyses. The types of normalization performed by the normalization module 318 can vary and/or be omitted in different embodiments.

A clustering module 320 clusters the behavior sequences of the software so that similar behavior sequences are clustered together. The clustering module 320 compares each behavior sequence to other behavior sequences and identifies a set of clusters, where each cluster contains a set of similar behavior sequences. As the behavioral sequences are from both malware 312 and goodware 314, a resulting cluster can consist of sequences of a single class (e.g., all malware), or can contain a mix of both classes.

In one embodiment, the clustering module 320 uses edit distance as a measure of similarity (i.e., the distance measure) and clusters together behavior sequences that are identical within a threshold number of edits. The edit distance threshold can vary depending upon the embodiment. In addition, different embodiments of the clustering module 320 use different and/or additional clustering techniques and similarity measures to cluster the behavior sequences.

A cluster analysis module 322 analyzes the clusters of behavior sequences to identify subsequences that can be used as behavioral signatures for malware. In one embodiment, the cluster analysis module 322 analyzes each cluster to determine the classes of software represented by the behavior sequences within the cluster. As mentioned above, a cluster can contain sequences from malware, goodware, or a combination of the two classes.

In one embodiment, the cluster analysis module 322 identifies clusters that contain sequences from predominantly one class of software. For example, the module 322 can identify clusters that contain sequences from exclusively one class of software, and/or clusters that contain more than a threshold amount (e.g., 95%) of sequences from one class of software.

Typically, behavior sequences from related software tend to cluster together. Different versions (e.g., different patch levels) of the same goodware often perform substantially the same behaviors and, therefore, the sequences from the different versions will tend to cluster together. Similarly, sequences from different instances of a polymorphic malware family tend to cluster together because the behaviors of the malware stay consistent despite the polymorphisms. Therefore, a cluster that contains sequences predominantly from malware (called a "malware cluster") is presumed to describe the behaviors of a single malware family, e.g., a set of malware that are related through polymorphisms, a common code base, or another relationship.

The cluster analysis module 322 analyzes the malware clusters to identify behavior subsequences useful for detecting malware in the families represented by the clusters. To find such a subsequence for a malware family represented by a cluster, the module 322 identifies one or more subsequences that are common to all of the behavior sequences in that cluster. In other words, the module 322 identifies one or more portions of the behavior sequences that are found in all of the behavior sequences in the cluster. Alternatively, in an embodiment where the cluster contains both malware and goodware, the cluster analysis module 322 identifies one or more behavior subsequences that are common to only the malware behavior sequences in the cluster. The behavior subsequences common to the behavior sequences in the cluster are referred to herein as "candidate sequences" because they represent candidates from which behavioral signatures can be created.

In one embodiment, the cluster analysis module 322 identifies a subsequence as a candidate only if the subsequence is longer than a threshold length. For example, the module 322 can identify candidate sequences that contain more than 10 behaviors, where a "behavior" here is an API call or operation. In this way, the cluster analysis module 322 excludes candidate sequences that are too short and likely to generate false positive malware detections because the candidates are not unique to the malware family.

If there are multiple candidate sequences, an embodiment of the cluster analysis module 322 evaluates the candidates to identify the candidate that occurs earliest in the behavior sequences in the cluster. Different candidates can occur at different locations in the behavior sequences. One candidate might tend to occur near the end of the behavior sequences in the cluster while another candidate might tend to occur near the beginning of the behavior sequences. In this situation, the cluster analysis module 322 selects the earlier-appearing candidate sequence as the sequence to be used for detecting the malware in the family. Using the earlier sequence is advantageous because it allows for earlier detection of the malware at the clients 116. Other embodiments use additional and/or different criteria to select a sequence from among multiple candidate sequences.

A signature creation module 324 creates behavioral signatures based on the candidate sequences selected by the cluster analysis module 322. For a candidate sequence selected for a given cluster, the signature creation module 324 converts the candidate sequence back to its behavior trace form. This conversion involves expanding any operations in the candidate sequence back into the original behavior sequence, while optionally maintaining the parameter normalization. The signature creation module 324 generates the behavioral signature from the converted candidate sequence. The behavioral signature describes the sequence of behaviors that are performed by the malware family represented by the corresponding cluster. Thus, the signature can be used by the security modules 116 of the clients 112 to detect instances of the malware family at the clients. In this manner, an embodiment of the signature creation module 324 creates signatures corresponding to all, or a selected subset, of the malware clusters.

A signature update module 326 updates behavioral signatures in view of new malware samples added to the malware dataset 312. In one embodiment, the signature update module 326 uses the other modules of the signature generation module 118 to efficiently generate signatures that cover the new malware. When a new malware sample is added to the malware dataset 312, the signature update module 326 uses the behavior collection 316 and trace normalization modules 318 to generate a behavior sequence for the new malware sample. The signature update module 326 also uses the clustering module 320 to determine whether the new behavior sequence aligns (clusters) with one of the already-existing clusters.

If the new behavior sequence aligns with an already-existing cluster, the signature update module 326 uses the cluster analysis module 322 module to analyze the cluster in view of the newly-added behavior sequence and generate new candidate sequences if necessary. In one embodiment, this analysis entails determining whether the current selected candidate sequence (i.e., the candidate sequence from which the behavioral signature for the cluster was generated) also describes the behavior sequence for the new malware sample. If so, then the new malware can be detected using the existing behavioral signature for the cluster and it is not necessary to update the signature for the cluster.

If the current selected candidate sequence does not describe the new behavior sequence, the signature update module 326 uses the cluster analysis module 322 to generate new candidate sequences for the cluster. The new candidate sequences are common to the behavior sequence of the new malware sample and the behavior sequences that were already in the cluster. Then, the signature update module 326 uses the cluster analysis module 322 to select among the new candidate sequences, and uses the signature creation module 324 to generate a new behavioral signature for the cluster based on the selected candidate sequence. The signature generation module 118 distributes this new behavioral signature to the security modules 116 of the clients 112.

If the new behavior sequence does not align with an existing cluster, an embodiment of the signature update module 326 uses the clustering module 320 to create a new cluster for the behavior sequence. The signature update module 326 uses the cluster analysis 322 and signature creation 324 modules to identify candidate sequences for the new cluster and create a new behavioral signature for a sequence selected from among the candidates. The signature generation module 118 distributes the behavioral signature for the new cluster to the security modules 116 of the clients 112.

In one embodiment, rather than attempting to cluster the behavior sequence of the new malware sample with the existing clusters, the signature update module 326 re-clusters the behavior sequences of all of the software in the datasets 312, 314 (which includes the behavior sequence for the new malware). The re-clustering can be performed each time new malware is identified, when a specified amount of new malware is identified (e.g., when 50 new malware samples are identified since the last clustering), on a calendar-based schedule, and/or at other times. In addition, the signature updating techniques can also be used to generate updated signatures in view of new goodware and/or when software are removed from the malware 312 or goodware 314 datasets.

Figure 4:
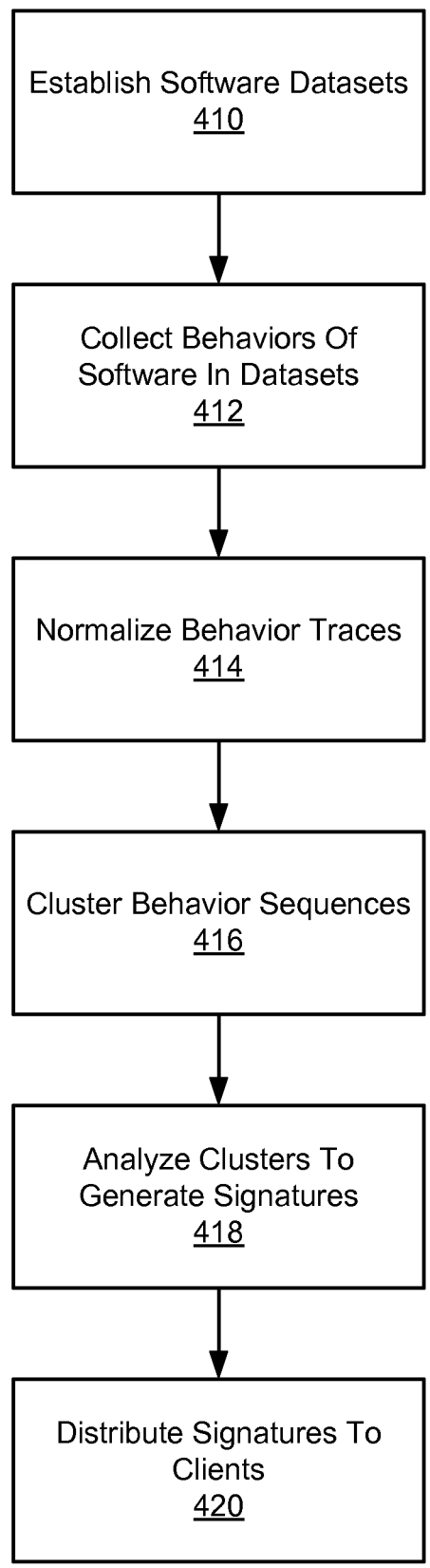
FIG. 4 is a flow chart illustrating steps performed by one embodiment of the security server to generate and distribute behavioral signatures.

FIG. 4 is a flow chart illustrating steps performed by one embodiment of the security server 110 to generate and distribute behavioral signatures. Other embodiments can perform different and/or additional steps. Moreover, other embodiments can perform the steps in different orders. Further, some or all of the steps can be performed by entities other than the security server 110.

Initially, software datasets are established 410. The software datasets include the malware dataset 312 and the goodware dataset 314. The security server 110 collects 412 behavior traces for the software in the datasets by, e.g., executing the software in emulation environments. The security server 110 normalizes 414 the behavior traces of the software by placing the traces in a standard representation. As part of the normalization, the security server 110 also groups 414 related sequential behaviors in the traces into operations to form behavior sequences.

The security server 110 clusters 416 similar behavior sequences together using, e.g., edit distance as the measure of similarity. The security module 110 analyzes 418 clusters that contain sequences predominantly from malware in order to identify candidate sequences of behaviors that can be used identify the malware. The security module 110 selects from among the candidate sequences for a malware cluster and uses the selected candidate sequence to generate 418 a behavioral signature for the malware family represented by the cluster. The security server 110 distributes 420 the signatures generated for the malware clusters to the security modules 116 of the clients 112.

Figure 5:
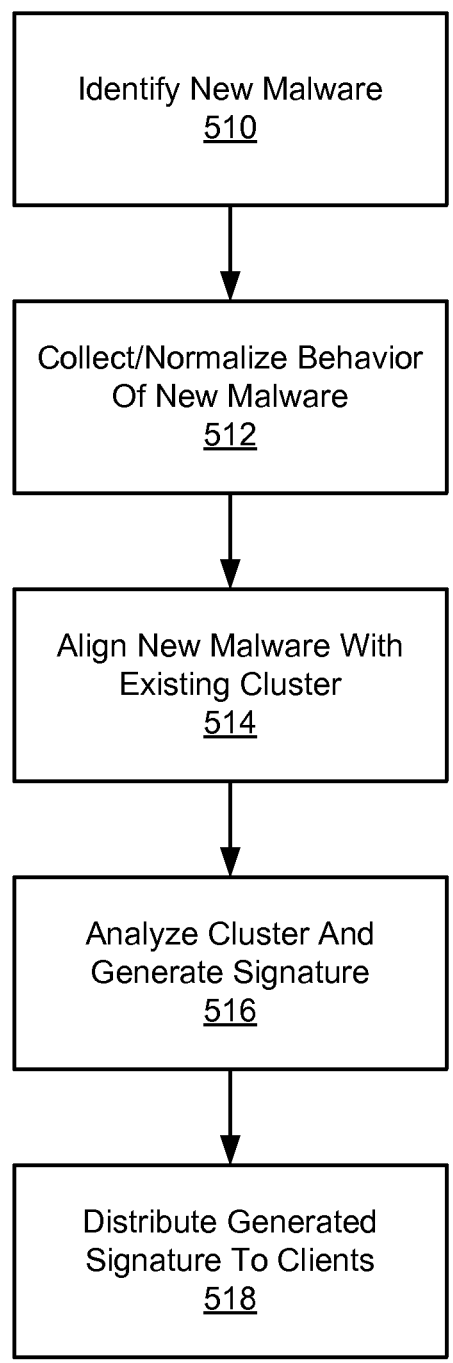
FIG. 5 is a flow chart illustrating steps performed by one embodiment of the security server to generate and distribute an updated behavioral signature for detecting a new malware sample.

FIG. 5 is a flow chart illustrating steps performed by one embodiment of the security server 110 to generate and distribute an updated behavioral signature for detecting a new malware sample. As with the steps shown in FIG. 5, other embodiments can perform different and/or additional steps and the steps can be performed in different orders or by different entities.

Initially, the new malware sample is identified 510 and added to the malware dataset 312. The security server 110 collects 512 a behavior trace for the new malware and normalizes the behavior trace to produce a behavior sequence. The security server 110 aligns 514 this behavior sequence with an existing cluster, if possible. Assuming that the behavior trace aligns with a cluster, the security server 110 analyzes the cluster and regenerates 516 a signature for the cluster that encompasses the new malware sample and the other malware that was already in the cluster, if necessary. The security server 110 distributes 518 the generated signature to the security modules 116 of the clients 112. The new signature can be distributed as a replacement for the previous signature for the cluster.

Thus, the technique described herein allows for the automated generation of a small and effective set of behavioral signatures that can detect families of malware. Moreover, the technique efficiently generates new signatures as new malware and malware variants are discovered.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of generating a behavioral signature for detecting malicious software (malware) comprising:
    using a computer to collect malware behavior traces of malware in a malware dataset, the malware behavior traces describing sequential behaviors performed by the malware;
    using a computer to collect goodware behavior traces of goodware in a goodware dataset, the goodware behavior traces describing sequential behaviors performed by the goodware;
    normalizing the malware behavior traces for the malware to produce malware behavior sequences;
    normalizing the goodware behavior traces for the goodware to produce goodware behavior sequences;
    clustering similar malware and goodware behavior sequences together in a cluster, wherein the malware behavior sequences in the cluster describe behaviors of a malware family;
    analyzing the cluster to identify a behavior subsequence common to only the malware family; and
    creating a behavioral signature for the malware family using the behavior subsequence common to only the malware family.

2. The method of claim 1, further comprising:
    subsequent to creating the behavioral signature:
        collecting a behavior trace of new malware, the new malware not previously a member of the malware dataset;
        normalizing the behavior trace for the new malware to produce a behavior sequence for the new malware;
        determining whether the behavior sequence for the new malware aligns with the cluster of malware and goodware behavior sequences;
        responsive to the behavior sequence for the new malware aligning with the cluster, analyzing the cluster to identify a new behavior subsequence common only to the malware behavior sequences in the cluster and to the behavior sequence for the new malware; and
        creating a new behavioral signature for the malware family using the new behavior subsequence.

3. The method of claim 1, wherein the malware and goodware behavior traces describe performed application programming interface (API) calls.

4. The method of claim 1, wherein normalizing the behavior traces for the malware to produce malware behavior sequences comprises:
    grouping related sequential behaviors in a malware behavior trace together to form an operation, wherein a malware behavior sequence comprises one or more sequential behaviors and one or more operations.

5. The method of claim 1, wherein clustering similar malware and goodware behavior sequences together in a cluster comprises:
    determining edit distances among the malware and goodware behavior sequences; and
    clustering the malware and goodware behavior sequences responsive to the determined edit distances.

6. The method of claim 1, wherein analyzing the cluster to identify a behavior subsequence common to only the malware family comprises:
    identifying a plurality of candidate subsequences common to only the malware behavior sequences in the cluster;
    identifying where in the malware behavior sequences the candidate subsequences appear; and
    selecting the behavior subsequence from among the candidate subsequences responsive to where in the malware behavior sequences the candidate subsequences appear.

7. The method of claim 6, wherein selecting the behavior subsequence from among the candidate subsequences responsive to where in the malware behavior sequences the candidate subsequences appear comprises:
    selecting the behavior subsequence responsive to the behavior subsequence appearing earlier in the malware behavior sequences than other candidate subsequences.

8. The method of claim 1, further comprising distributing the behavioral signature to a security module of a client, wherein the security module is adapted to use the behavioral signature to detect malware residing at the client.

9. The method of claim 1, wherein using the computer to collect the malware behavior traces comprises:
- emulating execution of the malware in a virtual computing environment; and
- monitoring the emulated execution of the malware to record a sequence of application programming interface (API) calls to an operating system made by the malware.

10. A computer system for generating a behavioral signature for detecting malicious software (malware), comprising:
- a non-transitory computer-readable storage medium storing executable computer program modules for performing steps comprising:
  - collecting malware behavior traces of malware in a malware dataset, the malware behavior traces describing sequential behaviors performed by the malware;
  - collecting goodware behavior traces of goodware in a goodware dataset, the goodware behavior traces describing sequential behaviors performed by the goodware;
  - normalizing the malware behavior traces for the malware to produce malware behavior sequences;
  - normalizing the goodware behavior traces for the goodware to produce goodware behavior sequences;
  - clustering similar malware and goodware behavior sequences together in a cluster, wherein the malware behavior sequences in the cluster describe behaviors of a malware family;
  - analyzing the cluster to identify a behavior subsequence common to only the malware family; and
  - creating a behavioral signature for the malware family using the behavior subsequence common to only the malware family; and
- a computer processor for executing the computer program modules.

11. The computer system of claim 10, the steps further comprising:
- subsequent to creating the behavioral signature:
  - collecting a behavior trace of new malware, the new malware not previously a member of the malware dataset;
  - normalizing the behavior trace for the new malware to produce a behavior sequence for the new malware;
  - determining whether the behavior sequence for the new malware aligns with the cluster of malware and goodware behavior sequences;
  - responsive to the behavior sequence for the new malware aligning with the cluster, analyzing the cluster to identify a new behavior subsequence common only to the malware behavior sequences in the cluster and to the behavior sequence for the new malware; and
  - creating a new behavioral signature for the malware family using the new behavior subsequence.

12. The computer system of claim 10, wherein normalizing the behavior traces for the malware to produce malware behavior sequences comprises:
- grouping related sequential behaviors in a malware behavior trace together to form an operation, wherein a malware behavior sequence comprises one or more sequential behaviors and one or more operations.

13. The computer system of claim 10, wherein analyzing the cluster to identify a behavior subsequence common to only the malware family comprises:
- identifying a plurality of candidate subsequences common to only the malware behavior sequences in the cluster;
- identifying where in the malware behavior sequences the candidate subsequences appear; and
- selecting the behavior subsequence from among the candidate subsequences responsive to where in the malware behavior sequences the candidate subsequences appear.

14. The computer system of claim 13, wherein selecting the behavior subsequence from among the candidate subsequences responsive to where in the malware behavior sequences the candidate subsequences appear comprises:
- selecting the behavior subsequence responsive to the behavior subsequence appearing earlier in the malware behavior sequences than other candidate subsequences.

15. The computer system of claim 10, wherein collecting the malware behavior traces comprises:
- emulating execution of the malware in a virtual computing environment; and
- monitoring the emulated execution of the malware to record a sequence of application programming interface (API) calls to an operating system made by the malware.

16. A non-transitory computer-readable storage medium storing executable computer program modules for generating a behavioral signature for detecting malicious software (malware), the modules comprising modules for:
- collecting malware behavior traces of malware in a malware dataset, the malware behavior traces describing sequential behaviors performed by the malware;
- collecting goodware behavior traces of goodware in a goodware dataset, the goodware behavior traces describing sequential behaviors performed by the goodware;
- normalizing the malware behavior traces for the malware to produce malware behavior sequences;
- normalizing the goodware behavior traces for the goodware to produce goodware behavior sequences;
- clustering similar malware and goodware behavior sequences together in a cluster, wherein the malware behavior sequences in the cluster describe behaviors of a malware family;
- analyzing the cluster to identify a behavior subsequence common to only the malware family; and
- creating a behavioral signature for the malware family using the behavior subsequence common to only the malware family.

17. The computer-readable storage medium of claim 16, further comprising modules for:
- subsequent to creating the behavioral signature:
  - collecting a behavior trace of new malware, the new malware not previously a member of the malware dataset;
  - normalizing the behavior trace for the new malware to produce a behavior sequence for the new malware;
  - determining whether the behavior sequence for the new malware aligns with the cluster of malware and goodware behavior sequences;
  - responsive to the behavior sequence for the new malware aligning with the cluster, analyzing the cluster to identify a new behavior subsequence common only to the malware behavior sequences in the cluster and to the behavior sequence for the new malware; and
  - creating a new behavioral signature for the malware family using the new behavior subsequence.

18. The computer-readable storage medium of claim 16, wherein normalizing the behavior traces for the malware to produce malware behavior sequences comprises:
- grouping related sequential behaviors in a malware behavior trace together to form an operation, wherein a malware behavior sequence comprises one or more sequential behaviors and one or more operations.

19. The computer-readable storage medium of claim 16, wherein analyzing the cluster to identify a behavior subsequence common to only the malware family comprises:
- identifying a plurality of candidate subsequences common to only the malware behavior sequences in the cluster;
- identifying where in the malware behavior sequences the candidate subsequences appear; and
- selecting the behavior subsequence from among the candidate subsequences responsive to where in the malware behavior sequences the candidate subsequences appear.

20. The computer-readable storage medium of claim 16, wherein collecting the malware behavior traces comprises:
- emulating execution of the malware in a virtual computing environment; and
- monitoring the emulated execution of the malware to record a sequence of application programming interface (API) calls to an operating system made by the malware.

* * * * *